(12) United States Patent
Divelbiss et al.

(10) Patent No.: US 6,727,867 B2
(45) Date of Patent: Apr. 27, 2004

(54) 3D STEREOSCOPIC SHUTTER GLASS SYSTEM

(75) Inventors: Adam W. Divelbiss, Wappingers Falls, NY (US); David C. Swift, Cortlandt Manor, NY (US); Walter V. Tserkovnyuk, Yonders, NY (US)

(73) Assignee: Vrex, Inc., Elmsford, NY (US)

( * ) Notice: Subject to any disclaimer, the term of this patent is extended or adjusted under 35 U.S.C. 154(b) by 180 days.

(21) Appl. No.: 10/067,629

(22) Filed: Feb. 4, 2002

(65) Prior Publication Data

US 2002/0118277 A1 Aug. 29, 2002

Related U.S. Application Data

(60) Provisional application No. 60/266,248, filed on Feb. 2, 2001.

(51) Int. Cl.[7] .......................... G09G 5/00; H04N 13/04
(52) U.S. Cl. .......................................................... 345/7
(58) Field of Search ............................. 348/51, 55, 42, 348/296, 298, 367, 739; 345/7, 8, 9

(56) References Cited

U.S. PATENT DOCUMENTS 5,821,989 A * 10/1998 Lazzaro et al. ............... 348/56
6,348,916 B1 * 2/2002 Jeong et al. ................. 345/213

* cited by examiner

Primary Examiner—Steven Saras
Assistant Examiner—Uchendu O. Anyaso
(74) Attorney, Agent, or Firm—Gerow D. Brill Esq.; Ralph J. Crispino Esq.

(57) ABSTRACT

A first embodiment of the invention permits an extension of battery life through detection of the display synchronization signals of a computer and a power management system. The power management system also eliminates need for batteries through use of a 5V power source from pin 9 of the VGA port. A second embodiment improves the ease of use and the utility of the 3D system through removable glasses with improvements over the previous design. These embodiments have improved manufacturability through the use of design that is tolerant of poor quality, low cost components with low electrical tolerances.

3 Claims, 6 Drawing Sheets

Improved 3D Shutter Glass Functional Block Diagram

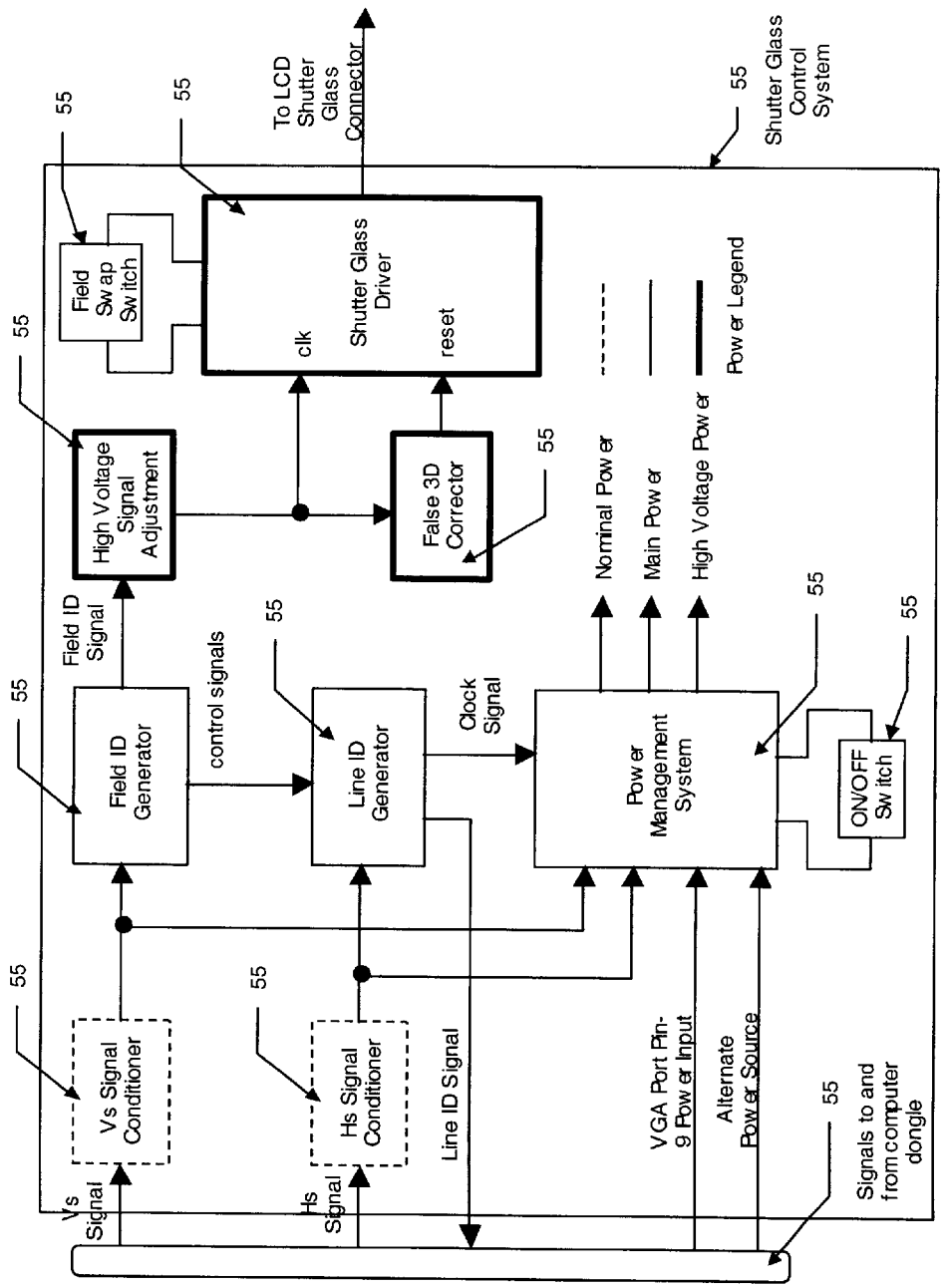
Figure 1. Improved 3D Shutter Glass Functional Block Diagram

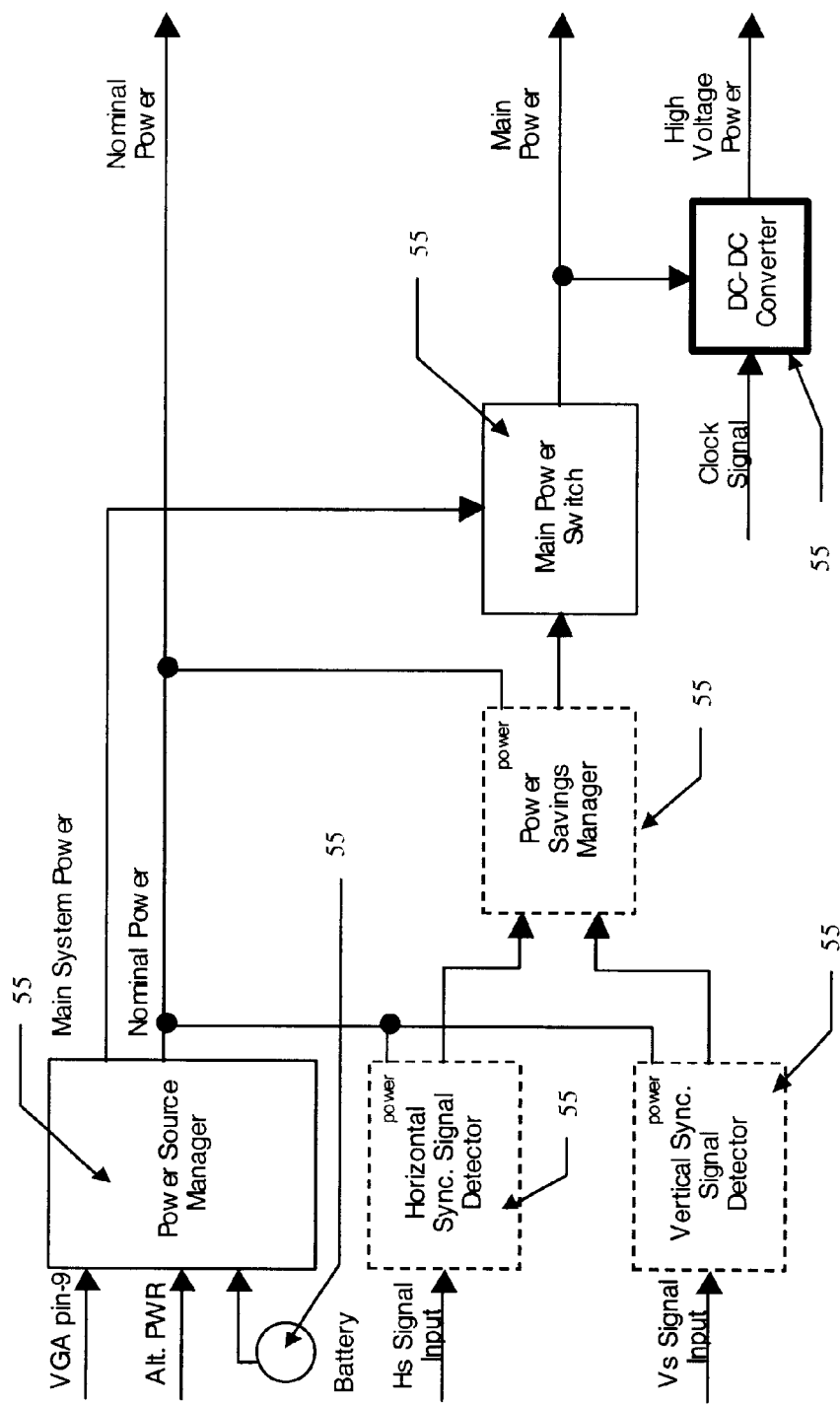
Figure 2. Improved 3D Shutter Glass Power Management System

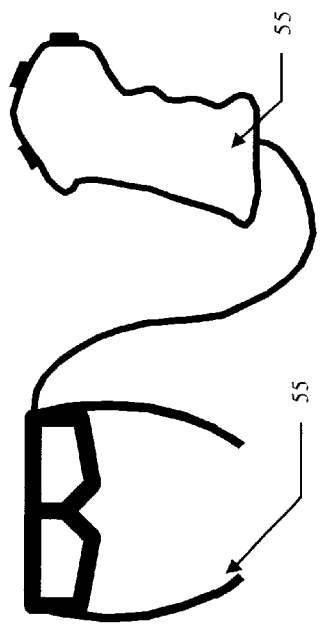
Figure 3. Prior Art 3D Shutter Glass System in Which the Shutter Glass Unit is Permanently Attached to the Shutter Glass Control Unit

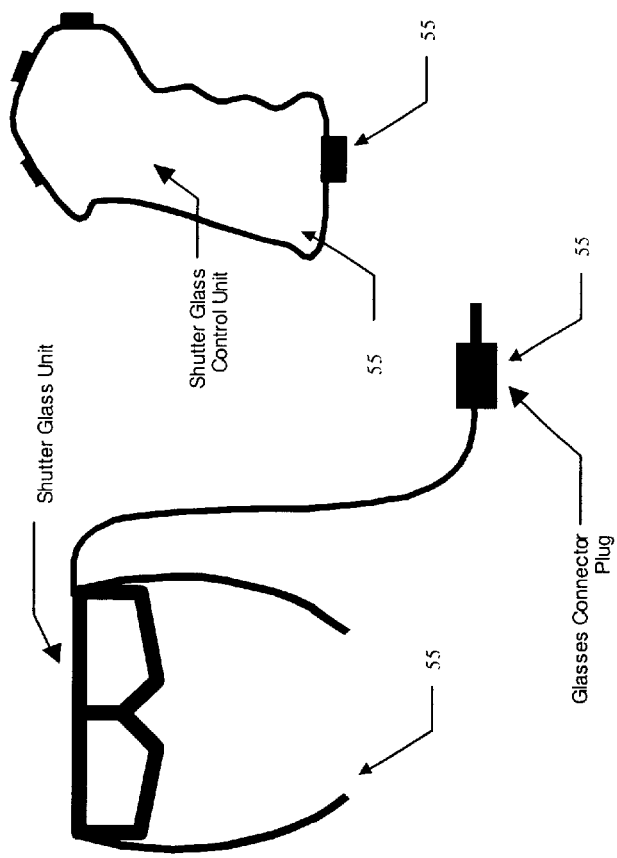
Figure 4. Improved Shutter Glass System In Which the Shutter Glass Unit is Detachable from the Shutter Glass Control Unit Through a Glasses Connection System

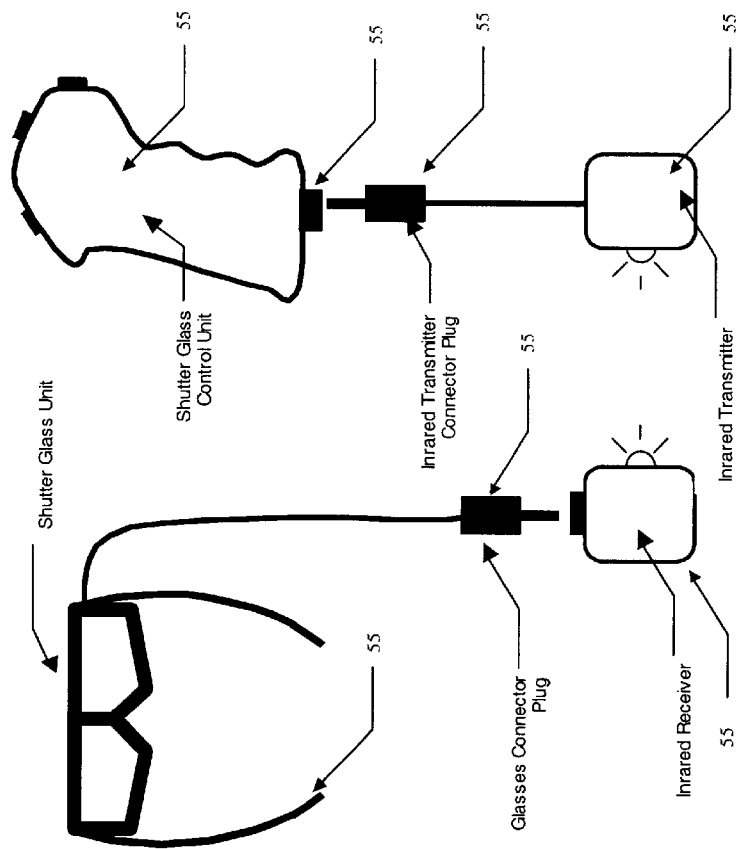
Figure 5. Improved 3D Shutter Glass System in which an External Infrared Transmitter/Receiver Pair has been incorporated using the standardized connection system

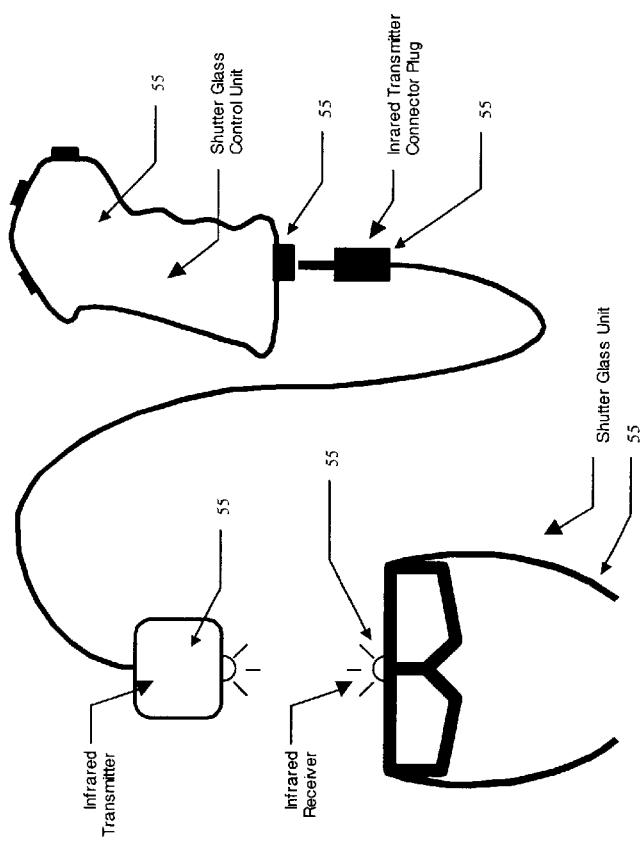
Figure 6. Improved 3D Shutter Glass System in which an External Infrared Transmitter and Internal Infrared Receiver Pair has been incorporated using the standardized connection system

3D STEREOSCOPIC SHUTTER GLASS SYSTEM

CROSS REFERENCE TO RELATED APPLICATIONS

This application is a Non-provisional Patent Application based upon U.S. Provisional Application Serial No. 60/266,248 filed by the instant inventors on Feb. 2,2001 and is hereby incorporated by reference. This application is related to U.S. Pat. No. 5,821,989 ('989) by Lazzaro et al, issued on Oct. 13, 1998 and is hereby incorporated by reference. This application is also related to International Application PCT/US00/27446 filed on Oct. 5, 2000 and is hereby incorporated by reference. This application is also related to U.S. patent application Ser. No. 09/745,230 filed on Dec. 21, 2000 and is hereby incorporated by reference.

BACKGROUND OF THE INVENTION

Previous shutter glass systems required a specific on/off switch to reduce power consumption and avoid shortening the life of the shutter glass material. The nature of the material used in shutter glasses is such if the voltage is left in one state for extended periods of time, the life of the shutter glass material is reduced. There is a need for a shutter glass system that turns off when no signal is received.

While previous designs of shutter glasses have permitted removable glasses, there is a need for a common connection system so that IR systems and non-IR systems are able to use the same control systems.

One of the goals in any shutter glass system is to achieve low cost. Such a goal may be achieved with improved manufacturability through use of design that is tolerant of poor quality, lower cost components with low electrical tolerances.

BRIEF SUMMARY OF THE INVENTION

A first embodiment of the invention permits an extension of battery life through detection of the display synchronization signals of a computer and a power management system. The power management system also eliminates need for batteries through use of a 5V power source from pin 9 of the VGA port.

A second embodiment improves the ease of use and the utility of the 3D system through removable glasses with improvements over the previous design.

These embodiments have improved manufacturability through the use of design that is tolerant of poor quality, low cost components with low electrical tolerances

BRIEF DESCRIPTION OF THE DRAWINGS

FIG. 1 illustrates a block diagram of an improved 3D shutter glass system of the present invention;

FIG. 2 illustrates an improved 3D shutter glass power management system;

FIG. 3 illustrates a 3D shutter glass system in which the shutter glass unit is permanently attached to the shutter glass control unit;

FIG. 4 illustrates an improved shutter glass system in which the shutter glass unit is detachable from the shutter glass control unit through a glasses connection system;

FIG. 5 illustrates an improved 3D shutter glass system in which an external infrared transmitter/receiver pair has been incorporated using the standardized connection system; and FIG. 6 illustrates an improved 3D shutter glass system in which an external infrared transmitter and internal infrared receiver pair has been incorporated using the standardized connection system.

DETAILED DESCRIPTION OF THE INVENTION

FIG. 1 illustrates the functional block diagram for an improved 3D shutter glass system 10 of the present invention. As is the case with other prior art shutter glass systems (e.g., the '989 patent) a "dongle" is used to make an electrical connection between the monitor port of a computer system and the shutter glass control system. In this figure, the computer dongle is represented on the left hand side of the figure with various signals 12 being input and various other signals being output. The computer dongle in the preferred embodiment provides a vertical synchronization signal, a horizontal synchronization signal, a common ground, and a 5 V power connection to the shutter glass control system. In the preferred embodiment, the Shutter Glass Control System provides a line-ID signal to the dongle to control blanking of the three color channels at the appropriate time. The Shutter Glass Control System also provides signals to drive one or more pairs of shutter glasses directly or through an external infrared transmitter.

The Shutter Glass Control System is comprised of several components including the Vs Signal Conditioner 14, the Hs Signal Conditioner 16, the Power Management System 18, the Field ID Generator 20, the Line ID Generator 22, the High Voltage Signal Adjustment 24, the False 3D Corrector 26, and the Shutter Glass Driver 28. Each of these components receives electrical power from one of three sources. These electrical power sources are the Nominal Power source, the Main Power Source, and the High Voltage Power source. Components receiving power from the Nominal Power source are outlined with a thin dashed line. Components driven by the Main Power Source are outlined with a thin solid line. Components driven by the High Voltage Power Source are outlined with a thick solid line. The purpose of splitting the power sources in this fashion will be made clear in the following component descriptions.

The Vs Signal Conditioner 14 receives the Vs (vertical sync) signal and applies special filters to eliminate noise and to normalize the polarity signal. The Vs signal may be normally low or normally high depending on the refresh rate and resolution of the image being generated by the computer graphics card. Filtering and normalizing the polarity of this signal helps to reduce the complexity of the remainder of the circuit and also helps improve the robustness of the overall system by making it less sensitive to low quality/low cost components that may be used in manufacturing. Power for the Vs Signal Conditioner 14 is supplied by the Nominal Power source and is switched directly by the ON/OFF button 30.

Similar to the Vs Signal Conditioner 14, the Hs Signal Conditioner 16 receives the Hs (horizontal sync) signal and applies special filters to eliminate noise and to normalize the polarity signal. The Hs signal may be normally low or normally high depending on the refresh rate and resolution of the image being generated by the computer graphics card. Filtering and normalizing the polarity of this signal helps to reduce the complexity of the remainder of the circuit and also helps improve the robustness of the overall system by making it less sensitive to low quality/low cost components that may be used in manufacturing. Power for the Hs Signal conditioner 16 is supplied by the Nominal Power source and is switched directly by the ON/OFF button 30.

The Field ID (identification) Generator 20 receives an output from the Vs Signal Conditioner and forms a square wave whose edges coincide with the rising edge of the conditioned Vs signal. For the case in which computer software identifies the field by encoding field ID information in the Vs signal, the Field ID Generator interprets this information and properly formats the Field ID output to match the encoded field identification information. For instance, in one embodiment, software may encode the field ID by varying the width of the Vs sync pulse such that a short pulse identifies field 1 and a long pulse identifies field 2. The Field ID Generator 20 would interpret the variation in pulse widths and set the Field ID output high (low) during field 1 and set the Field ID output low (high) during field 2. Other methods of Field ID encoding may be used as more fully described in the '989 patent. Power for the Field ID Generator is supplied by the Main Power source and is subject to the power savings feature described below.

The High Voltage Signal Adjustment system 24 formats the Field ID signal from the Field ID Generator 20 for use with the high voltage Shutter Glass Driver system 10. This system is an improvement to previous shutter glass systems such as the PCT/US/0027446 application and the '989 patent cited above, in that it permits the use of low cost components, which may have wide ranging electrical tolerances, to be used in the manufacturing process. It does this by using passive components that dissipate minimal power to conserver battery life. In the preferred embodiment the High Voltage Signal Adjustment system 24 adds an electrical DC bias to the Field ID signal to center it about a voltage that is half of the High Power Source voltage in value. Since the DC offset is based on the voltage supplied by the High Voltage Power portion of the Power Management system 18. This voltage is dependent on the internal battery or pin-9 power voltage. Proper operation of the Shutter Glass Driver 28 is ensured even as the source voltage drops over time due to aging of the battery. With out the High Voltage Signal Adjustment 20, the shutter glass system will have a much shorter effective battery life and will be highly susceptible to variances in component tolerances. Power for the High Voltage Signal Adjustment 24 is supplied by the High Voltage Power portion of the Power Management System 18 and is subject to the power savings feature described below.

The False 3D Corrector 26 is a system that ensures that interpretation of the Field ID signal by the Shutter Glass Driver 28 remains consistent when power to the Shutter Glass Driver 28 is cycled on and off, whether by switching the ON/OFF switch or by cycling of the battery savings feature. More specifically, if the left lens of the shutter glass is intended to be open when the Field ID signal is high, the False 3D Corrector 26 ensures that this condition always occurs even if power to the Shutter Glass Driver is cycled OFF and ON. Power for the False 3D Corrector 26 is supplied by the High Voltage Power portion of the Power Management System 18 and is subject to the power savings feature described below.

The Shutter Glass Driver 28 formats the Field ID signal into control signals for the 3D shutter glasses. Depending on the setting of the Field Swap Switch 32 and the interpretation of the Field ID signal, one shutter (left or right) will be caused to open when the Field ID is high while the other shutter (right or left) is closed. The reverse condition will be true when the Field ID is low. This function is similar to other prior art 3D shutter glass systems such as the '989 patent except that power to the system is controlled by the battery savings feature implemented in the Power Management System 18.

The Line ID Generator 22 generates a line ID signal to be used by a Line Modification system located in the computer dongle. The purpose of the Line ID Generator is to produce a square wave signal that is high during the display of even (odd) lines during field 1 and is high during the display of odd (even) lines during field 2. The line ID signal serves to indicate which set of lines (even or odd) of a row-interleaved 3D image are displayed unchanged by the 3D shutter glass system and which lines are to be altered for display (whether by line blanking or some other means). The Line ID Generator 22, as a by product of generating the line ID signal, produces a square wave, clock signal, in the 15 kHz frequency range that may be used by the Power Management System 18 to produce the High Voltage Power. Power for the Line ID Generator is supplied by the Main Power source and is subject to the power savings feature described below.

Two of the primary advantages of the present invention over earlier systems involve the extension of battery life through an automatic shut-off feature, and the operational flexibility of using either an internal battery or 5V power through pin-9 of the host computer's monitor connector. These functions are realized through the Power Management System 18.

When the ON/OFF Switch is in the ON position, the Power Management System 18 extends the battery life and in general conserves the power required by the entire system by monitoring the output of the Vs Signal Conditioner and the Hs Signal Conditioner and then by switching Main Power and High Voltage Power ON only if certain input signal conditions are met. In one embodiment, the Power Management System 18 applies Main Power and High Voltage Power if the Vs Signal Conditioner 14 detects the Vertical Sync signal. Another embodiment would apply these two power outputs only if the Hs Signal Conditioner 16 detects the Horizontal Sync signal. Yet a third embodiment applies power only if their respective signal conditioners detect both the vertical sync signal and the horizontal sync signal. In this fashion, power to the main body of the system is applied if and only if the proper sync signal configuration are detected, thereby saving battery life when the entire system is unusable. Since the sync signals are required by a computer monitor to display an image, they are therefore required when displaying a 3D image. If the sync signals are not present, it is not possible to display a 3D image. Therefore the 3D shutter glass system is not needed and should be disabled to save battery life.

The power savings feature described above applies only when the ON/OFF 30 switch is in the ON position. When the ON/OFF switch is in the OFF position, all power to the 3D Shutter Glass system is cut off.

Control signals to and from the 3D Shutter glass system are provide by a computer dongle. Signals included in the preferred embodiment include the Vertical Sync signal input, the Horizontal Sync signal input, the Line ID signal output, 5V "pin-9" power, and ground. Alternatively there may be an alternate power supply (such as a wall adapter source) that could be provided through the computer dongle cable or cable adapter.

FIG. 2 illustrates the functional detail of the Power Management System 18 used to implement control of the battery savings feature and the dual power source feature of the present invention.

The Power Source Manager 40 selects one of several sources of electrical power for use in driving the entire 3D Shutter Glass System 10. In the preferred embodiment these sources include an internal battery and 5V power from pin-9 of the computer monitor connector. Alternatively other power sources could be provided as well depending on the purpose and application of the embodiment. The Power Source Manager 40 selects the power source input based on an optimal voltage and/or current. Power from the selected source is switched to the Nominal Power and Main System power outputs.

The Horizontal Sync Signal Detector 42 receives the conditioned horizontal sync signal from the Hs Signal Conditioner 16 of FIG. 1. Depending on the desired operation of the battery savings feature, the Horizontal Sync Signal Detector 42 may utilize one of several methods to recognizing the presence of the horizontal sync signal and output a high (or low) signal upon successful detection. In the preferred embodiment the conditioned horizontal sync signal is integrated and compared to ground using an exclusive OR function gate. The result is a high signal output when the horizontal sync is present and a low signal out when it is not present. Other methods could also be employed. The Horizontal Sync Signal Detector 42 is necessarily powered by the Nominal Power source from the Power Source Manager 40.

The Vertical Sync Signal Detector 44 is identical in function to the Horizontal Sync Signal Detector 42 expect that it acts on the conditioned vertical sync signal output from the Vs Signal Conditioner 14 of FIG. 1.

The Power Savings Manager 46 receives the output of both the Horizontal Sync Signal Detector 42 and the Vertical Sync Signal Detector 44 and, based upon the desired battery savings operation, controls the Main Power Switch 48 used to source power to the remainder of the 3D Shutter Glass System 10. In the preferred embodiment, both vertical and horizontal sync would need to be detected in order to switch on Main System Power. Other criteria for switching Main System Power are also possible including switching if only one of the sync signals is detected, switching based on the length of time one or both sync signals are present, etc.

The Main Power Switch 48 applies power to the remainder of the system based on a positive compliance to the sync signal detection criteria enforced by the Power Savings Manager 40.

A DC—DC Converter 50 is utilized to increase the voltage of the Main System Power in order to drive liquid crystal 3D shutter glasses. Typical DC—DC converters require a high frequency clock signal. The Line ID Generator 16 in FIG. 1 provides the clock signal in this case. A negative power pump driven by a line signal may also be used to provide the increased voltage.

FIG. 3 illustrates an 3D Shutter glass system shown in the '989 patent and the PCT/US/0027446 application in which the shutter glasses 50 are attached to the Shutter Glass Control Unit 52 by direct cable.

FIG. 4 illustrates a representation of an improved 3D Shutter Glass Connection system. In the figure, a detachable pair of 3D Shutter Glasses 54 is connected to the Shutter Glass Control Unit 52 by a standardized connection system. Other existing 3D shutter glass systems (e.g., I/O Display) have glasses that can be disconnected from the control unit. In the present invention other devices besides the 3D glasses, such as an infrared (IR) transmitter or low power RF transmitter, may be connected to the control box as well through the same connector system.

FIG. 5 illustrates an IR transmitter 60 connected to the Shutter Glass Control Unit 52 through the same standardized connector system as in the previous figure. The IR Transmitter interprets signals from the Shutter Glass Driver 28 inside the Control Unit 52 and converts them to infrared signals that for transmission to an IR enabled pair of shutter glasses. Also shown in the figure is the same pair of Shutter Glasses as in FIG. 4 with the same connector plug. In this case the glasses are connected to an IR Receiver using the same connection system. Many prior art systems use IR transmission to communicate between the 3D glasses and the Control Unit. However it is an object of this invention that the same connector system can be used to connect glasses and IR transmitter/receiver pairs interchangeably to the Shutter Glass Control Unit. The advantage of such a system is that customers may purchase a basic system with wired shutter glasses and then at a later date upgrade their system with IR transmitter/receiver pairs to make it a wireless shutter glass system.

FIG. 6 illustrates the same configuration as in FIG. 5 except that the IR receiver has been built directly into the shutter glasses. The advantage of this configuration is less wires and bulk. As previously stated the improvement of the present invention is a standardized connection system between the shutter glass control box, shutter glasses, IR transmitter/receiver pairs, and RF transmitter/receiver pairs that allow for greater flexibility in use and function.

The various embodiments of the present invention will be useful in many diverse stereoscopic display applications. However, it is understood that various modifications to the illustrative embodiments of the present invention will readily occur to persons with ordinary skill in the art. All such modifications and variations are deemed to be within the scope and spirit of the present invention as defined by the claims appended hereto.

What is claimed is:

1. A shutter glass control apparatus for a 3D stereoscopic display system comprising:

a vertical sync signal conditioner with an input coupled to a vertical sync input, and with outputs coupled to a field ID generator and a power management system;

a horizontal sync signal conditioner with an input coupled to a horizontal sync input and with outputs coupled to a line ID generator and said power management system;

a VGA port power and an alternate power source coupled to inputs of said power management system;

an on/off switch coupled to said power management system;

a nominal power output of said power management system coupled to said vertical sync conditioner and said horizontal sync conditioner;

a main power output of said power management system coupled to said filed ID generator and said line ID generator;

a high voltage output coupled to a high voltage adjustment circuit, a false 3D corrector and a shutter glass drive;

a field ID signal is coupled from said field ID generator and said high voltage adjustment circuit;

a high voltage adjustment circuit outputs coupled to said false 3D corrector and said shuttle glass driver;

a field swap switch is coupled to said shutter glass driver;

a false 3D corrector output coupled to shutter glass driver, an output of said shutter glass driver coupled to a LCD shutter glass connector.

2. The apparatus of claim 1 further comprising a handgrip shaped housing.

3. The apparatus of claim 1 wherein said power management system comprises:

a power source manager receiving said VGA power, alternate power and battery power; coupling main system power to a main power switch; coupling nominal power to a horizontal sync signal detector and a vertical sync signal detector; and providing main power to said shutter control system;

coupling a Hs signal to said horizontal sync signal detector;

coupling a Vs signal to said vertical sync signal detector;

coupling detected said horizontal sync signal and detected said vertical sync signal to a power savings manager;

coupling an output of said power savings manger to said main power switch; and coupling a main power output of said main power switch to high voltage power generator and coupling said main power to said shutter glass system, wherein said main power is produced when said Vs signal and Hs are present.

* * * * *